United States Patent
Sueishi

(10) Patent No.: US 9,013,841 B2
(45) Date of Patent: Apr. 21, 2015

(54) EARTH LEAKAGE CIRCUIT BREAKER AND IMAGE FORMING APPARATUS

(71) Applicant: KYOCERA Document Solutions Inc., Osaka (JP)

(72) Inventor: Naoki Sueishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/089,277

(22) Filed: Nov. 25, 2013

(65) Prior Publication Data

US 2014/0146424 A1    May 29, 2014

(30) Foreign Application Priority Data

Nov. 29, 2012 (JP) ................................. 2012-261560

(51) Int. Cl.
| | |
|---|---|
| *H02H 3/00* | (2006.01) |
| *H02H 3/16* | (2006.01) |
| *G03G 15/00* | (2006.01) |
| *H02H 1/06* | (2006.01) |
| *H02H 3/33* | (2006.01) |
| *H02M 7/06* | (2006.01) |
| *H02M 1/00* | (2006.01) |

(52) U.S. Cl.
CPC ............... *H02H 3/162* (2013.01); *G03G 15/55* (2013.01); *H02H 1/06* (2013.01); *H02H 3/33* (2013.01); *H02M 7/06* (2013.01); *H02M 2001/0006* (2013.01); *H02M 2001/0048* (2013.01)

(58) Field of Classification Search
USPC ..................................................... 361/42, 44
See application file for complete search history.

(56) References Cited

U.S. PATENT DOCUMENTS

| | | | |
|---|---|---|---|
| 4,161,022 A | 7/1979 | Kanazawa et al. | |
| 4,866,585 A | 9/1989 | Das | |
| 5,943,199 A * | 8/1999 | Aromin ........................... | 361/42 |
| 2008/0106831 A1 * | 5/2008 | Lewinski et al. ............... | 361/42 |

FOREIGN PATENT DOCUMENTS

| | | |
|---|---|---|
| GB | 2 000 398 A | 1/1979 |
| GB | 2 002 601 A | 2/1979 |
| JP | 2006-094639 A | 4/2006 |
| JP | 2009-199767 A | 9/2009 |

OTHER PUBLICATIONS

The extended European search report mailed by the European Patent Office on Jun. 11, 2014, in the corresponding European patent application No. 13194576.8—7 pages.

* cited by examiner

*Primary Examiner* — Danny Nguyen
(74) *Attorney, Agent, or Firm* — Knobbe, Martens, Olson & Bear LLP

(57) ABSTRACT

An earth leakage circuit breaker includes an earth leakage detector, a rectifier, a switching part, and a controller. The switching part is installed on an electric circuit between an alternating current (AC) power supply and the rectifier, and switches between supply and interruption of the power from the AC power supply. The earth leakage detector is installed between the AC power supply and a load. The rectifier rectifies the AC power into direct current (DC) power. The controller causes the rectifier to perform half-wave rectification until earth leakage is detected by the earth leakage detector, and causes the rectifier to perform full-wave rectification when the earth leakage is detected by the earth leakage detector.

6 Claims, 4 Drawing Sheets

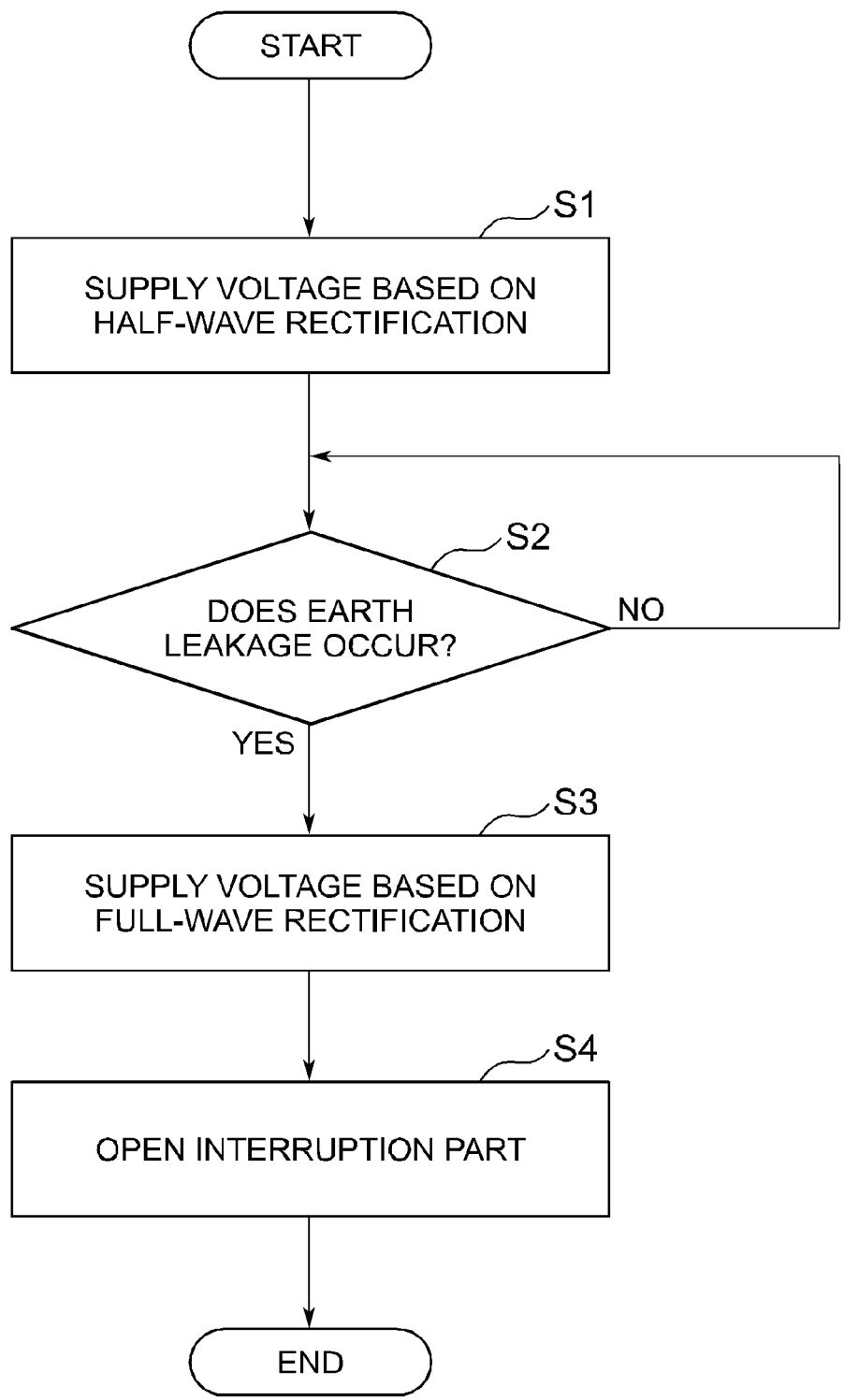

EARTH LEAKAGE CIRCUIT BREAKER AND IMAGE FORMING APPARATUS

INCORPORATION BY REFERENCE

This application claims priority to Japanese Patent Application No. 2012-261560 filed on Nov. 29, 2012, the entire contents of which are incorporated by reference herein.

BACKGROUND

The present disclosure relates to an earth leakage circuit breaker and an image forming apparatus and, more particularly, to technology for reducing power consumption of an earth leakage circuit breaker.

Electronics such as an image forming apparatus are generally provided with an earth leakage circuit breaker. Even when the electronics are in a standby state, the earth leakage circuit breaker such as an earth leakage breaker always operates to consume power. Accordingly, as the power consumption of the earth leakage circuit breaker is reduced, the power consumption of the electronics can be reduced.

For example, a power unit for preventing earth leakage is proposed in which both an earth leakage detector detecting earth leakage based on a secondary current of a zero-phase converter and an abnormality detector are installed on a power circuit, and when abnormal earth leakage is detected, supply of alternating current (AC) power to the power circuit is stopped, and supply of power to the earth leakage detector and the abnormality detector is also stopped, thereby reducing power consumption.

SUMMARY

Technology that further improves the aforementioned technologies is proposed as one aspect of the present disclosure.

An earth leakage circuit breaker according to one aspect of the present disclosure includes an earth leakage detector, a rectifier, a switching part, and a controller.

The earth leakage detector is installed on an electric circuit between an alternating current (AC) power supply and a load, and detects earth leakage.

The rectifier switches between a full-wave rectification method and a rectification method other than the full-wave rectification method, and rectifies AC power supplied from the AC power supply to generate direct current (DC) power.

The switching part is installed on an electric circuit between the AC power supply and the rectifier, and switches between supply and interruption of the power from the AC power supply.

The controller is driven by the DC power generated by the rectifier, and causes the switching part to interrupt the power from the AC power supply when the earth leakage is detected by the earth leakage detector.

The controller causes the rectifier to be operated according to the rectification method other than the full-wave rectification method until the earth leakage is detected by the earth leakage detector, and causes the rectifier to be operated according to the full-wave rectification method when the earth leakage is detected by the earth leakage detector.

Further, an image forming apparatus according to another aspect of the present disclosure includes the earth leakage circuit breaker, an image forming unit, and a fixing unit.

The image forming unit forms an image on a recording medium based on image data.

The fixing unit performs a fixing operation on the recording medium on which the image is formed by the image forming unit.

BRIEF DESCRIPTION OF THE DRAWINGS

FIG. 4 is a flow chart showing an operation of the earth leakage circuit breaker.

DETAILED DESCRIPTION

Figure 1:
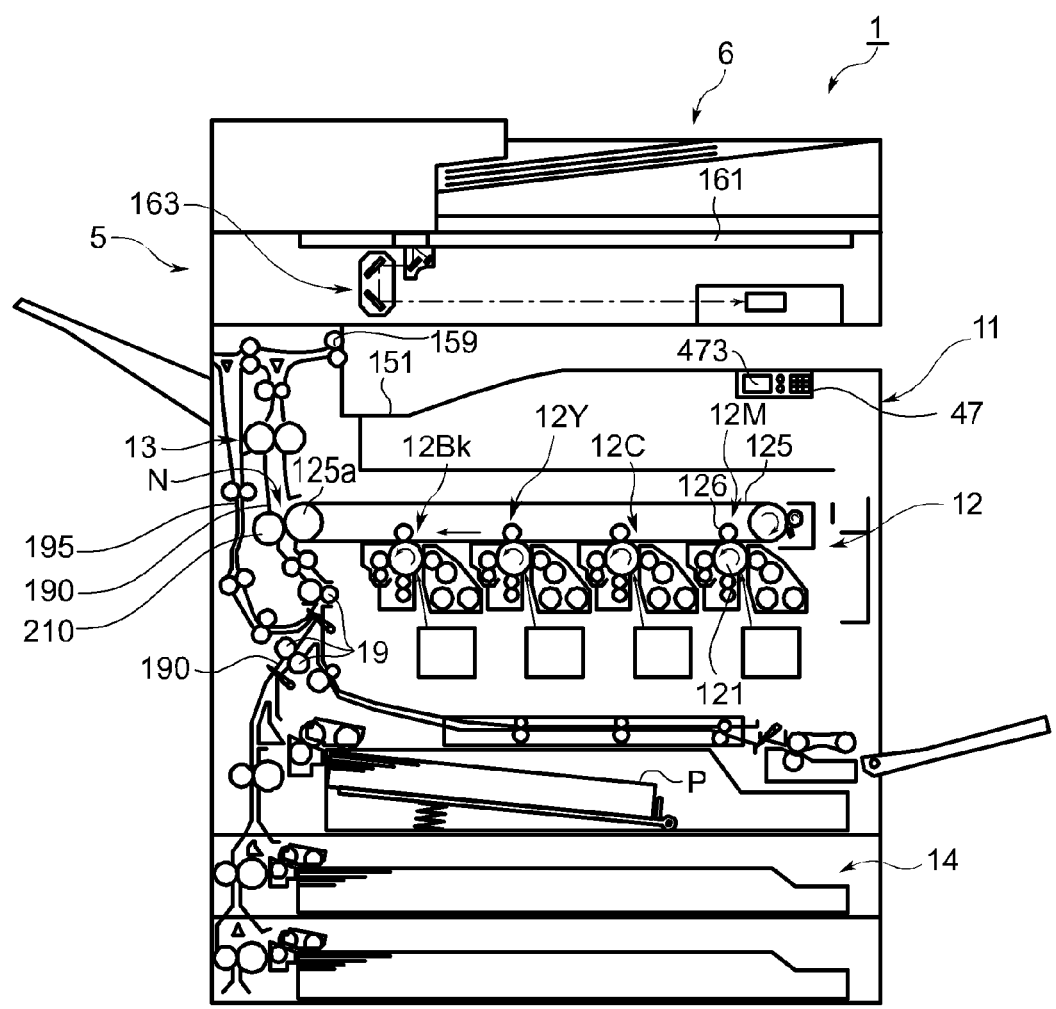
FIG. 1 is a front cross-sectional view showing an image forming apparatus according to an embodiment of the present disclosure.

Hereinafter, an earth leakage circuit breaker and an image forming apparatus according to an embodiment of the present disclosure will be described with reference to the attached drawings. FIG. 1 is a front cross-sectional view showing a structure of an image forming apparatus according to an embodiment of the present disclosure.

An image forming apparatus 1 according to an embodiment of the present disclosure is a multifunction device combining a plurality of functions such as a copy function, a printer function, a scanner function, and a facsimile function. The image forming apparatus 1 includes an apparatus main body 11 equipped with an operation unit 47, an image forming unit 12, a fixing unit 13, a paper feed unit 14, a document conveying unit 6, and a document reading unit 5. The image forming apparatus 1 is equipped with an earth leakage circuit breaker 2 (FIG. 3) according to an embodiment of the present disclosure.

The operation unit 47 receives instructions, such as an instruction to implement an image forming operation and an instruction to implement a document reading operation, from an operator with regard to various operations and processes which can be implemented by the image forming apparatus 1.

When the image forming apparatus 1 performs the document reading operation, the document reading unit 5 optically reads an image of a document fed by the document conveying unit 6 or a document placed on a document table glass 161 to generate image data. The image data generated by the document reading unit 5 is stored in an internal hard disk drive (HDD) or a networked computer.

When the image forming apparatus 1 performs the image forming operation, the image forming unit 12 forms a toner image on recording paper P as a recording medium fed from the paper feed unit 14 based on the image data generated by the document reading operation, the image data received from the networked computer, or the image data stored in the internal HDD. When color printing is carried out, an image forming unit 12M for magenta, an image forming unit 12C for cyan, an image forming unit 12Y for yellow, and an image forming unit 12Bk for black of the image forming unit 12 cause the toner images to be formed on photosensitive drums 121 based on images composed of respective color components constituting the image data by charging, exposure, and developing processes, and cause the toner images to be transferred to an intermediate transfer belt 125 by primary transfer rollers 126.

Each chromatic toner image transferred to the intermediate transfer belt 125 is superimposed on the intermediate transfer belt 125 by adjusting transfer timing, thereby becoming a color toner image. A secondary transfer roller 210 causes the color toner image formed on a surface of the intermediate transfer belt 125 to be transferred to the recording paper P, which is conveyed from the paper feed unit 14 along a conveying path 190, at a nip zone N between the secondary transfer roller 210 and a driving roller 125*a* with the intermediate transfer belt 125 sandwiched therebetween. Afterwards, the fixing unit 13 causes the toner image on the recording paper P to be fixed to the recording paper P by thermocompression. The recording paper P which on which the fixing process is completed and on which a color image is formed is ejected to an eject tray 151.

In the image forming apparatus 1, when double-side printing is carried out, the recording paper P, on one side of which the image is formed by the image forming unit 12, is nipped in an eject roller pair 159. In this state, the recording paper P is switched back by the eject roller pair 159, is sent to a reverse conveying path 195, and is re-conveyed to an upstream region in the conveying direction of the recording paper P with respect to the nip zone N and the fixing unit 13 by a conveying roller pair 19. Thereby, an image is formed on the other side of the recording paper by the image forming unit 12.

Figure 2:
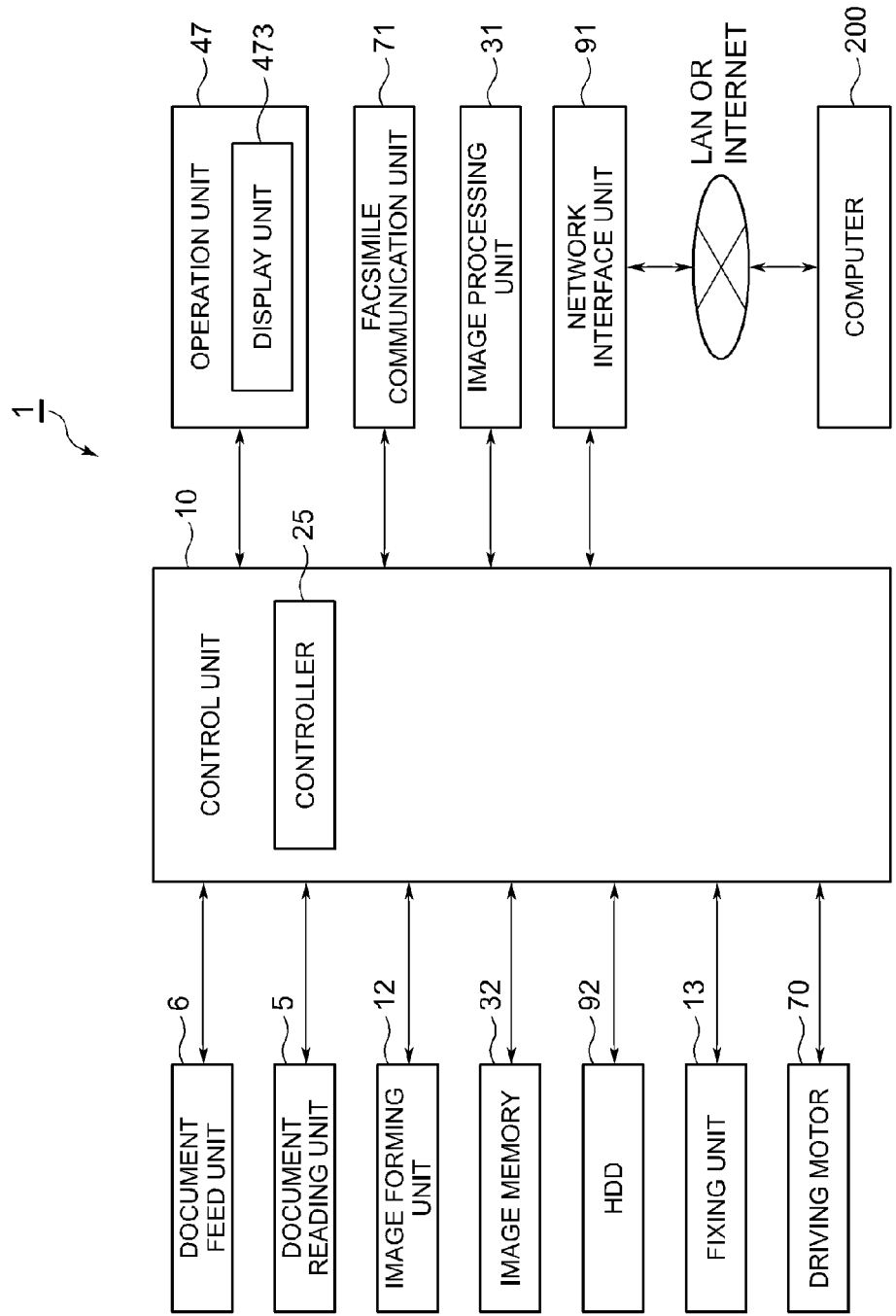
FIG. 2 is a functional block diagram showing a major internal constitution of the image forming apparatus.

Next, a constitution of the image forming apparatus 1 will be described. FIG. 2 is a functional block diagram showing a major internal constitution of the image forming apparatus 1.

The image forming apparatus 1 is equipped with a control unit 10. The control unit 10 is made up of a central processing unit (CPU), a random-access memory (RAM), a read-only memory (ROM), and a dedicated hardware circuit, and oversees overall operation control of the image forming apparatus 1.

The document reading unit 5 is equipped with a reading mechanism 163 (FIG. 1) having a light irradiator and a charge-coupled device (CCD) sensor under the control of the control unit 10. The document reading unit 5 reads the image from the document in such a manner that the document is irradiated by the light irradiator and reflected light is received by the CCD sensor.

An image processing unit 31 performs image processing on image data of the image read by the document reading unit 5 as needed. For example, the image processing unit 31 performs predetermined image processing such as shading compensation in order to improve an image quality after the image read by the document reading unit 5 is image-formed by the image forming unit 12.

An image memory 32 is a region that temporarily stores the data of the document image obtained by the reading of the document reading unit 5 and that temporarily preserves data serving as a print target of the image forming unit 12.

The image forming unit 12 forms an image of the printing data read by the document reading unit 5 and an image of the printing data received from the networked computer 200.

The operation unit 47 receives instructions from an operator with regard to various operations and processes that can be implemented by the image forming apparatus 1. The operation unit 47 is equipped with a display unit 473.

A facsimile communication unit 71 is equipped with an encoding/decoding unit, a modulation/demodulation unit, and a network control unit (NCU), and performs transmission of a facsimile using a public telephone line network.

A network interface unit 91 is made up of a communication module such as a local area network (LAN) board, and transmits/receives various data to/from the networked computer 200 via a LAN connected to the network interface unit 91.

An HDD 92 is a high-capacity storage device that stores the document image read by the document reading unit 5.

The fixing unit 13 causes the image formed by the image forming unit 12 to be fixed to the recording paper by heating and pressurizing.

A driving motor 70 is a drive source that provides a rotation driving force to each rotary member of the image forming unit 12 and the conveying roller pair 19.

The control unit 10 is equipped with a controller 25. The controller 25 is connected to the document reading unit 5, the document conveying unit 6, the image processing unit 31, the image memory 32, the image forming unit 12, the operation unit 47, the facsimile communication unit 71, the network interface unit 91, the HDD 92, and the fixing unit 13, and controls driving of each unit.

The image forming apparatus 1 obtains alternating current power from a commercial power supply, and supplies each unit with direct current (DC) power or alternating current (AC) power. An earth leakage circuit breaker 2 (FIG. 3) to be described below is installed on a receiving end of the commercial power supply in the image forming apparatus 1. In the control unit 10, a functional portion controlling an operation of the earth leakage circuit breaker 2 is defined as the controller 25.

Figure 3:
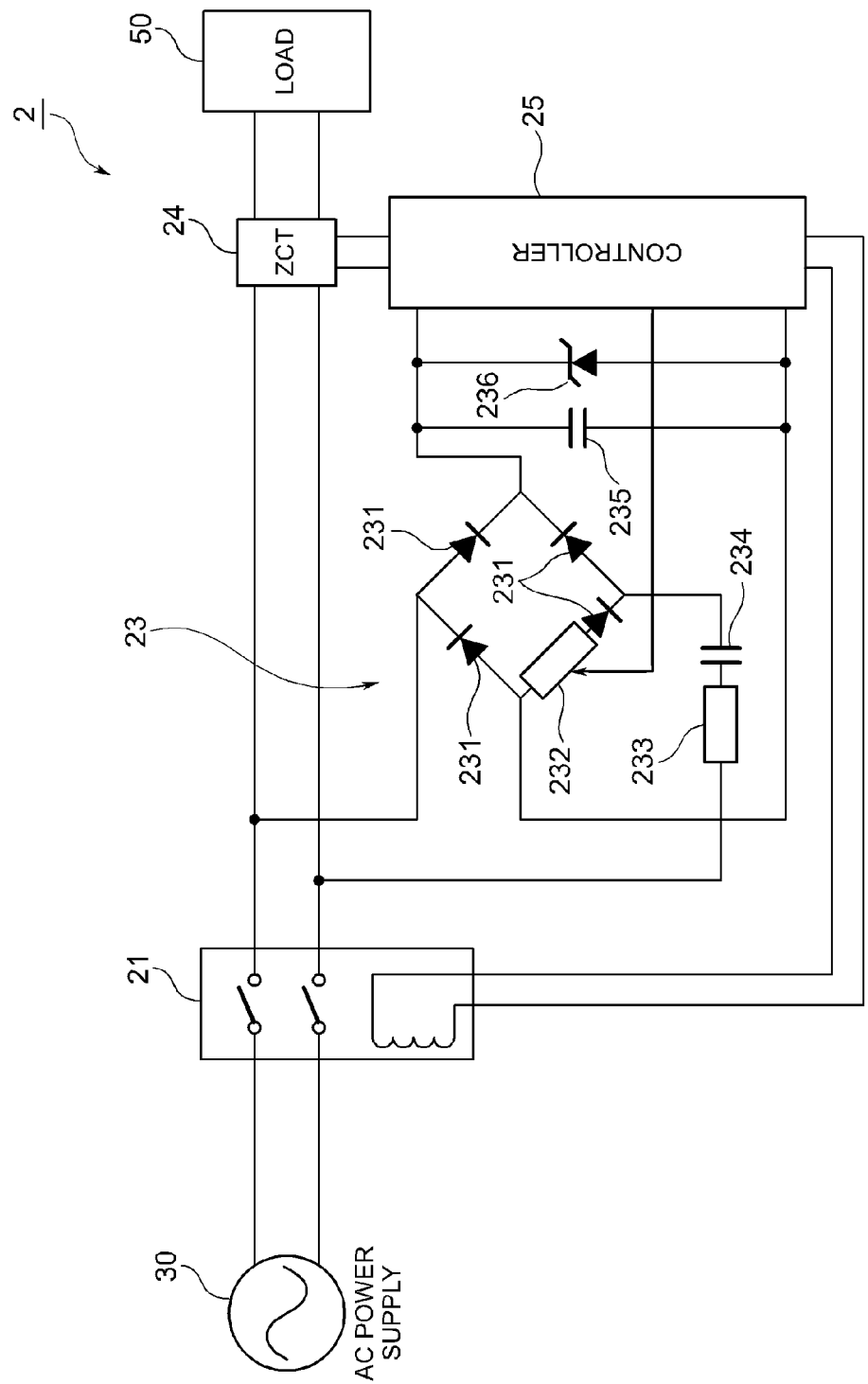
FIG. 3 is a schematic circuit diagram of an earth leakage circuit breaker according to an embodiment of the present disclosure.

FIG. 3 is a schematic circuit diagram of an earth leakage circuit breaker 2 according to an embodiment of the present disclosure. The earth leakage circuit breaker 2 is inserted between an AC power supply 30 such as a commercial power supply and a load 50, detects earth leakage (earth fault), and interrupts power supplied to the load 50 upon detecting the earth leakage. The load 50 is each unit such as the image forming unit 12, the document reading unit 5, the document conveying unit 6, and the fixing unit 13 in the image forming apparatus 1.

The earth leakage circuit breaker 2 is equipped with a switching part 21, a rectifier 23, an earth leakage detector 24, and the controller 25.

Specifically, the switching part 21 has a controlling relay, for instance a switch activated by an electromagnet. In the present embodiment, the AC power supply 30 is a single-phase two-wire system, and the switch of the switching part 21 is inserted into each wire. The switching part 21 is opened, thereby, two wires are disconnected, and the connection to the AC power supply 30 is interrupted. When DC power is supplied from the controller 25, the electromagnet releases a contact of the switch to open the switch.

The rectifier 23 rectifies AC power supplied from the AC power supply 30, thereby generating DC power. The rectifier 23 is connected to a secondary side of the switching part 21. In the present embodiment, the rectifier 23 is equipped with a bridge full-wave rectifier circuit made up of four diodes 231, a smoothing capacitor 235, and a constant voltage Zener diode 236.

Furthermore, in the bridge full-wave rectifier circuit, a switch element 232 that is subjected to switching control by the controller 25 is connected in series to one of the four diodes 231.

The controller 25 puts the switch element 232 into an on state, thereby causing the rectifier 23 to operate as a full-wave rectifier. On the other hand, the controller 25 puts the switch element 232 into an off state, thereby causing the rectifier 23 to operate as a half-wave rectifier. In this way, the rectifier 23 is designed to be able to switch a rectification method between full-wave rectification and half-wave rectification by the switching control of the switch element 232 based on the controller 25.

At an output side of the diode 231 to which the switch element 232 is connected, a resistor 233 and a capacitor 234 connected in series to the resistor are provided as a filter for adjusting a phase difference.

The earth leakage detector 24 is installed on an electric circuit between the AC power supply 30 and the load 50. In the present embodiment, a zero-phase current transformer (ZCT) is used as the earth leakage detector 24. The earth leakage detector 24 is made up of, for instance, an endless core and a secondary winding wound around the endless core, and induces a voltage to the secondary winding when earth leakage occurs, thereby detecting the earth leakage.

The controller 25 is driven by the DC power generated by the rectifier 23. The controller 25 performs the switching control of the switching part 21 and the switching control of the switch element 232 of the bridge full-wave rectifier circuit.

A constitution of the earth leakage detector 24 and the switching control of the switching part 21 based on the controller 25 will be described. The zero-phase current transformer serving as the earth leakage detector 24 has the endless core, and the single-phase two wires of the AC power supply 30 go through the endless core. Since currents flowing through the two wires are balanced at normal times, a secondary side current (zero-phase current) does not flow through the secondary winding. However, when earth fault (earth leakage) occurs, the currents flowing through the two wires are unbalanced. Magnetic flux is generated from the endless core by such a current difference, and a voltage is induced in the secondary winding, so that the zero-phase current flows. When the earth leakage occurs, i.e. when the voltage is induced in the secondary winding, the controller 25 amplifies the corresponding voltage to supply the power to the electromagnet of the switching part 21, and releases the contact of the switch of the switching part 21 to open the corresponding switch.

The switching control of the switch element 232 of the bridge full-wave rectifier circuit based on the controller 25 will be described. The controller 25 is driven by the DC power generated by the rectifier 23. However, until the earth leakage of the AC power supply 30 is detected, the controller 25 controls the switch element 232 in an on state, thereby causing the rectifier 23 to operate as the half-wave rectifier. Until the earth leakage of the AC power supply 30 is detected, the controller 25 causes the rectifier 23 to be operated according to the rectification method based on low-power half-wave rectification. Thereby, it is possible to reduce power consumption when monitoring the earth leakage of the earth leakage circuit breaker 2. On the other hand, when the earth leakage of the AC power supply 30 is detected, the controller 25 controls the switch element 232 in an on state, thereby causing the rectifier 23 to operate as the full-wave rectifier from that time. In this way, after the earth leakage of the AC power supply 30 is detected, the controller 25 causes the rectifier 23 to be operated according to the rectification method based on high-power full-wave rectification. Thereby, the controller 25 is supplied with sufficient DC power. Especially, when there is a need to supply the DC power having a sufficient intensity to release the contact of the switch of the switching part 21, the controller 25 switches the rectification method of the rectifier 23 to the full-wave rectification when detecting the earth leakage. Thereby, it is possible to supply sufficient DC power to release the contact of the switch to the switching part 21.

Next, an operation of the earth leakage circuit breaker 2 will be described. FIG. 4 is a flow chart showing an operation of the earth leakage circuit breaker 2.

First, when power is applied to the image forming apparatus 1, the controller 25 puts the switch element 232 of the full-wave rectifier of the rectifier 23 into an off state. Thereby, the rectifier 23 operates as the half-wave rectifier, and performs half-wave rectification on the AC power supplied from the AC power supply 30 to generate DC power (S1).

The controller 25 is driven by the DC power generated by the half-wave rectification in this way, and monitors a voltage generated at the secondary side of the earth leakage detector 24 to monitor whether or not the earth leakage occurs (S2). Even when the low power generated by the half-wave rectification is supplied, the controller 25 and the earth leakage detector 24 can monitor the earth leakage. In this way, until the earth leakage is detected, the rectifier 23 is caused to be operated as the half-wave rectifier. Thereby, the power consumption of the earth leakage circuit breaker 2 is reduced when monitoring the earth leakage.

When it is detected that the voltage of the secondary side winding of the earth leakage detector 24 exceeds a value predetermined for the earth leakage detection, i.e., when the earth leakage occurs (YES in S2), the controller 25 puts the switch element 232 of the rectifier 23 into an on state, causes the rectifier 23 to be operated as the full-wave rectifier, performs full-wave rectification on the AC power, and converts the AC power into DC power (S3).

While being driven by the DC power based on the full-wave rectification, the controller 25 supplies the DC power to the switching part 21. When the DC power is supplied from the controller 25, the electromagnet of the switching part 21 releases the contact of the switch to open the switch (S4). Thereby, when the earth leakage occurs, the power supplied from the AC power supply 30 is interrupted. In this way, the controller 25 drives the switching part 21 using the DC power based on the full-wave rectification. Thereby, sufficient DC power to release the contact of the switch is particularly supplied to the switching part 21, so that the switch of the switching part 21 can be reliably opened by the switching part 21, and safety is guaranteed.

For example, a power unit equipped with an earth leakage circuit breaker different from that of the present embodiment interrupts power supplied to a power circuit when the earth leakage occurs, and also interrupts power supplied to the earth leakage detector, thereby reducing power consumption. However, in this power unit, since constant power is always supplied to the earth leakage detector at normal times, it is impossible to reduce the power consumption at normal times, and further power saving is demanded.

However, in the earth leakage circuit breaker 2 according to the present embodiment, as described above, it is possible to achieve the power saving while guaranteeing the safety without lowering precision of monitoring the earth leakage.

The present disclosure is not limited to the constitution of the above embodiment, and various modifications can be made. For example, in the above embodiment, the description has been made using the multifunction device as one embodiment of the image forming apparatus according to the present disclosure. However, this is merely one example. For example, another image forming apparatus such as a printer, a copier, or a facsimile device may be used.

Further, in the above embodiment, in order to put the power when the earth leakage is monitored by the earth leakage circuit breaker 2 into low power, the example in which the half-wave rectification is employed as the rectification method based on the rectifier 23 is shown. However, the present disclosure is not limited to such an embodiment. As the rectification method of the rectifier 23 of the earth leakage circuit breaker 2 according to the embodiment of the present disclosure, another rectification method such as quarter-wave rectification may be employed. The quarter-wave rectification allows the power consumption of the earth leakage circuit breaker 2 at normal times to be further reduced.

Further, in the above embodiment, the constitutions and processes represented by the above embodiment using FIGS. 1 to 4 are merely one embodiment of the present disclosure, and there is no intent to limit the present disclosure to such constitutions and processes.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An earth leakage circuit breaker comprising:
    an earth leakage detector that is installed on an electric circuit between an alternating current (AC) power supply and a load, and detects earth leakage;
    a rectifier that switches between a full-wave rectification method and a rectification method other than the full-wave rectification method, and rectifies AC power supplied from the AC power supply to generate direct current (DC) power;
    a switching part that is installed on an electric circuit between the AC power supply and the rectifier, and switches between supply and interruption of the power from the AC power supply; and
    a controller that is driven by the DC power generated by the rectifier, and causes the switching part to interrupt the power from the AC power supply when the earth leakage is detected by the earth leakage detector,
    wherein the controller causes the rectifier to be operated according to the rectification method other than the full-wave rectification method until the earth leakage is detected by the earth leakage detector, and causes the rectifier to be operated according to the full-wave rectification method when the earth leakage is detected by the earth leakage detector.

2. The earth leakage circuit breaker according to claim 1, wherein:
    the rectifier has a bridge full-wave rectifier circuit made up of four diodes, and one of the four diodes is connected in series to a switch element that is subjected to switching control by the controller; and
    the controller puts the switch element into an off state until the earth leakage is detected by the earth leakage detector, and puts the switch element into an on state when the earth leakage is detected by the earth leakage detector.

3. The earth leakage circuit breaker according to claim 1, wherein the controller is driven by the DC power based on half-wave rectification output from the rectifier until the earth leakage is detected by the earth leakage detector, and is driven by the DC power based on full-wave rectification output from the rectifier when the earth leakage is detected by the earth leakage detector.

4. The earth leakage circuit breaker according to claim 1, wherein the earth leakage detector is a zero-phase current transformer.

5. The earth leakage circuit breaker according to claim 1, wherein:
    the rectifier is configured so that the rectification method other than the full-wave rectification method is used as quarter-wave rectification; and
    the controller is driven by the DC power based on quarter-wave rectification output from the rectifier until the earth leakage is detected by the earth leakage detector.

6. An image forming apparatus comprising:
    the earth leakage circuit breaker according to claim 1;
    an image forming unit that forms an image on a recording medium based on image data and
    a fixing unit that performs a fixing operation on the recording medium on which the image is formed by the image forming unit.

* * * * *